United States Patent
Yoshimura et al.

(10) Patent No.: US 11,016,232 B2
(45) Date of Patent: *May 25, 2021

(54) OPTICAL FILM, RETARDATION FILM, AND POLARIZING PLATE

(71) Applicant: MITSUBISHI GAS CHEMICAL COMPANY, INC., Tokyo (JP)

(72) Inventors: Yasuaki Yoshimura, Kanagawa (JP); Eiichi Honda, Kanagawa (JP); Keita Noguchi, Kanagawa (JP); Yuichiro Satake, Kanagawa (JP)

(73) Assignee: MITSUBISHI GAS CHEMICAL COMPANY, INC., Tokyo (JP)

(*) Notice: Subject to any disclaimer, the term of this patent is extended or adjusted under 35 U.S.C. 154(b) by 125 days.

This patent is subject to a terminal disclaimer.

(21) Appl. No.: 16/337,075

(22) PCT Filed: Sep. 27, 2017

(86) PCT No.: PCT/JP2017/035073
§ 371 (c)(1),
(2) Date: Mar. 27, 2019

(87) PCT Pub. No.: WO2019/062326
PCT Pub. Date: Apr. 5, 2018

(65) Prior Publication Data
US 2020/0033523 A1    Jan. 30, 2020

(30) Foreign Application Priority Data
Sep. 28, 2016   (JP) ............................. JP2016-190300

(51) Int. Cl.
G02B 5/30       (2006.01)
C08G 63/199     (2006.01)
C08J 5/18       (2006.01)
G02B 1/04       (2006.01)

(52) U.S. Cl.
CPC ......... *G02B 5/3083* (2013.01); *C08G 63/199* (2013.01); *C08J 5/18* (2013.01); *C08J 2363/02* (2013.01); *G02B 1/04* (2013.01)

(58) Field of Classification Search
CPC ...... C08G 63/199; C08G 63/06; C08G 63/60; C08J 2363/02; C08J 5/18; C08J 2367/02; C08J 2367/04; G02B 1/04; G02B 5/3083; C08L 67/00; B29C 55/005
See application file for complete search history.

(56) References Cited

U.S. PATENT DOCUMENTS

2012/0301676 A1* 11/2012 Ushida .................. G02B 1/14
                                                    428/148
2013/0280554 A1* 10/2013 Yamazaki ............... H01B 5/14
                                                    428/697
2018/0142059 A1   5/2018 Honda et al.

FOREIGN PATENT DOCUMENTS

| CN | 107614569 A | | 1/2018 |
| EP | 3305827 A | | 8/2019 |
| JP | 2-92936 | | 4/1990 |
| JP | 2-253201 | | 10/1990 |
| JP | 6-43301 | | 2/1994 |
| JP | 2007161917 | * | 6/2007 |
| JP | 2007-197651 | | 8/2007 |
| JP | 2007-213043 | | 8/2007 |
| JP | 2007-224281 | | 9/2007 |
| JP | WO2012035874 | * | 3/2012 |
| WO | 2012/035874 | | 3/2012 |

OTHER PUBLICATIONS

Denis E. Ryono et al., "Electrostatic Facilitation of General Acid Catalyzed a-Oxonium Ion Formation in a Lysozyme-Like Environment: Synthesis of the Models", Journal of the American Chemical Society, 98(7), May 21, 1975, pp. 1889-1899.
Official Communication issued in International Application No. PCT/JP2017/035073, dated Jan. 9, 2018.

* cited by examiner

*Primary Examiner* — Ling Siu Choi
*Assistant Examiner* — Gennadiy Mesh
(74) *Attorney, Agent, or Firm* — Greenblum and Bernstein P.L.C.

(57) ABSTRACT

Optical films comprising a polyester resin comprising a structural unit (A) of the following formula (1) wherein the content of the structural unit (A) based on the total structural units of the polyester resin is 76 mol % or greater:

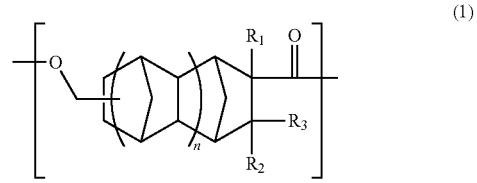

wherein $R_1$ is a hydrogen atom, $CH_3$, or $C_2H_5$; $R_2$ and $R_3$ is each independently a hydrogen atom or $CH_3$; and n is 1, for example, Decahydro-1,4:5,8-dimethanonaphthalene-2-methoxycarbonyl-6(7)-methanol. Retardation films and circularly or elliptically polarizing plates comprising the optical films are also provided.

5 Claims, 2 Drawing Sheets

OPTICAL FILM, RETARDATION FILM, AND POLARIZING PLATE

TECHNICAL FIELD

The present invention relates to an optical film, a retardation film, and a polarizing plate.

BACKGROUND ART

Retardation films are used mainly as components such as viewing angle-widening films of liquid crystal displays or organic electroluminescence (occasionally referred to as "organic EL" hereinafter) displays or as components of circularly polarizing plates. Characteristics required of retardation films include optical characteristics such as transparency, the ability to produce an appropriate phase difference, and wavelength dispersion of phase difference, and further include a low photoelastic coefficient and sufficient heat resistance for allowing these optical characteristics to be stably exhibited.

Liquid crystal displays are constructed from a liquid crystal cell, a polarizing plate, a retardation film, etc. In reflective or transmissive liquid crystal displays, for example, the retardation film is used in combination with the polarizing plate to form a circularly polarizing plate. In such a circularly polarizing plate, the polarizing plate extracts only linearly polarized component from unpolarized incident light, and the retardation film converts the extracted component to circularly polarized light, which is emitted.

In organic EL displays, circularly polarizing plates are employed to improve visibility under external light such as in outdoor use. Organic EL display devices have an electrode made with a metal material having a high reflectance, and external light may be reflected at the interface of the electrode to cause problems such as reduced contrast of displayed images and reflected glare. The use of a circularly polarizing plate reduces the reflection of external light to prevent the occurrence of these undesired phenomena.

Examples of retardation films conventionally used include a film containing an aromatic polycarbonate resin and a film containing a polyester resin containing an alicyclic dicarboxylic acid component and an alicyclic diol component (Patent Literatures 1 and 2, for example).

CITATION LIST

Patent Literature

Patent Literature 1: Japanese Patent Laid-Open No. 2007-197651
Patent Literature 2: Japanese Patent Laid-Open No. 2007-224281

SUMMARY OF INVENTION

Technical Problem

However, an optical film containing a conventional aromatic polycarbonate resin has the problem of high photoelastic coefficient, although having heat resistance and mechanical strength. For example, when such an optical film is used as a retardation film attached to a polarizing plate in a liquid crystal display device or an organic EL display device, a problem arises in that the polarizing plate or the film itself may undergo thermal shrinkage, thermal swelling, or water absorption-induced swelling, and accordingly a stress acts on the retardation film, resulting in phase difference variation which precludes the display device from maintaining the uniformity of image quality.

In general, optical films containing a polyester resin containing an aromatic ring have poor optical characteristics with a high photoelastic coefficient. If the resin has high crystallinity, blushing may occur during film formation to cause reduced transparency. Optical films containing a completely aliphatic polyester resin have the problem of poor heat resistance. For these reasons, optical films containing a conventional polyester resin are unsatisfactory in terms of heat resistance, transparency, and optical characteristics.

The present invention has been made in view of the above problems of the prior art, and it is an object of the present invention to provide: an optical film such as a retardation film, the optical film having a low photoelastic coefficient (superior optical characteristics) and being superior in heat resistance and transparency; and a polarizing plate including the film.

Solution to Problem

As a result of intensive investigations aimed at solving the above problems, the present inventors have found that an optical film containing a polyester resin containing a particular alicyclic structure as a structural unit can be a solution to the problems, and have completed the present invention.

That is, the present invention is as follows.

[1]
An optical film comprising a polyester resin comprising a unit (A) of the following formula (1).

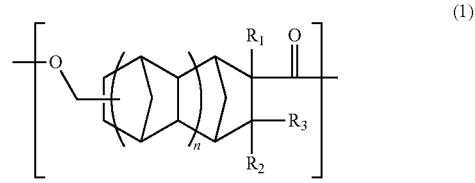

In the formula (1), $R_1$ is a hydrogen atom, $CH_3$, or $C_2H_5$, $R_2$ and $R_3$ are each independently a hydrogen atom or $CH_3$, and n is 0 or 1.

[2]
The optical film according to [1], wherein, in the formula (1), n is 1.

[3]
The optical film according to [1] or [2], wherein, in the formula (1), $R_1$, $R_2$, and $R_3$ are hydrogen atoms.

[4]
The optical film according to any one of [1] to [3], wherein the polyester resin satisfies the following conditions (1) and (2), and the optical film satisfies the following condition (3):
(1) a glass transition temperature of the polyester resin is 90° C. or higher;
(2) an amount of heat generated by the polyester resin at cooling crystallization is 5 J/g or less; and
(3) an absolute value of photoelastic coefficient of the optical film is $40 \times 10^{-12}$ $Pa^{-1}$ or less.

[5]
A retardation film comprising the optical film according to any one of [1] to [4].

[6]
A circularly or elliptically polarizing plate comprising the optical film according to any one of [1] to [4].

Advantageous Effects of Invention

The present invention can provide: an optical film such as a retardation film, the optical film having a low photoelastic coefficient and being superior in heat resistance and transparency; and a polarizing plate including the film.

DESCRIPTION OF EMBODIMENTS

Figure 1:
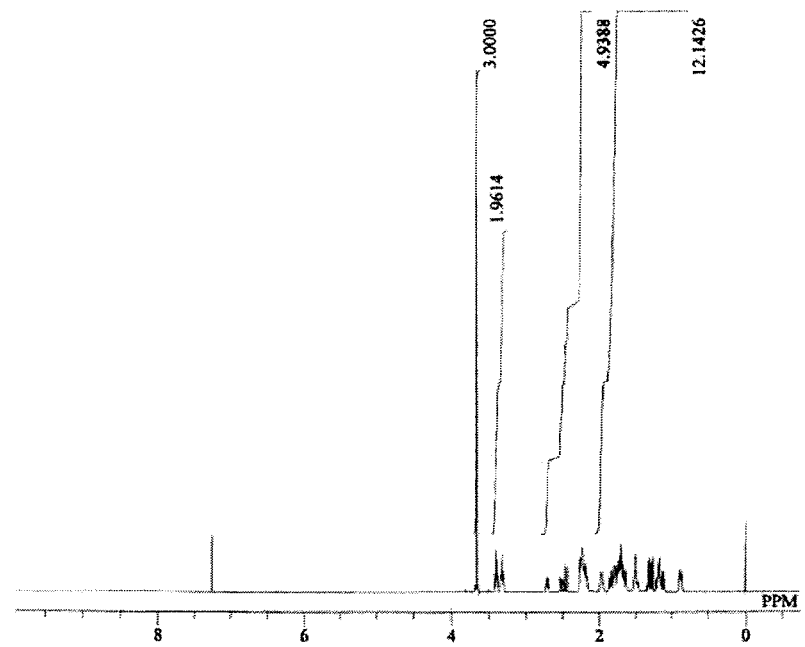
FIG. 1 shows a result of $^1$H-NMR measurement of a main reaction product obtained in a monomer synthesis example.

An embodiment of the present invention (which will be simply referred to as "present embodiment" hereinafter) will now be described in detail. The present embodiment described below is only illustrative of the present invention and is not intended to limit the present invention to the contents of the following description. The present invention can be carried out with appropriate modifications falling within the gist of the invention.
[Polyester Resin]
An optical film of the present embodiment includes a polyester resin containing a unit (A) of the following formula (1) (this unit may be referred to as "unit (A)" or "structural unit (A)" hereinafter). The resin may, if necessary, contain a diol unit (B) (this unit may be referred to as "unit (B)" or "structural unit (B)" hereinafter) and a unit (C) derived from a dicarboxylic acid or an ester-forming derivative thereof (this unit may be referred to as "unit (C)" or "structural unit (C)" hereinafter).

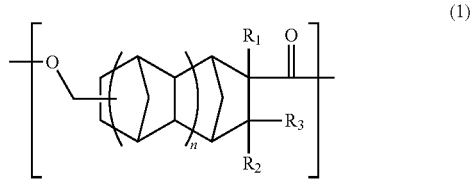

(1)

In the formula (1), $R_1$ is a hydrogen atom, $CH_3$, or $C_2H_5$, $R_2$ and $R_3$ are each independently a hydrogen atom or $CH_3$, and n is 0 or 1.

Being configured as described above, the optical film of the present embodiment is superior in transparency, heat resistance, and optical characteristics. In the present embodiment, "superior in heat resistance" means that the glass transition temperature (Tg) as measured by the method described in Examples below is sufficiently high, and "superior in optical characteristics" means that the absolute value of the photoelastic coefficient as measured by the method described in Examples below is sufficiently low.

In the formula (1), $R_1$ is preferably a hydrogen atom or $CH_3$, and $R_2$ and $R_3$ are preferably hydrogen atoms. In the present embodiment, $R_1$, $R_2$, and $R_3$ in the formula (1) are more preferably hydrogen atoms from the viewpoint of heat resistance.

In the formula (1), n is preferably 1 in order to further improve the heat resistance.

In the present embodiment, the content of the structural unit (A) based on the total structural units of the polyester resin is preferably 10 to 95 mol % from the viewpoint of the balance of transparency, heat resistance, and optical characteristics. When the content is 10 mol % or more, sufficiently good heat resistance and optical characteristics tend to be achieved. The reason why the content is preferably 95 mol % or less is that in this case the formability of the film can be improved while good heat resistance and optical characteristics are obtained. From the same viewpoint, the content of the unit (A) is more preferably 15 to 95 mol % and even more preferably 20 to 95 mol %.

In a preferred aspect, the optical film of the present invention includes a homopolyester resin containing the structural unit (A).

In another preferred aspect, the optical film of the present invention contains a copolymerized polyester resin containing the structural unit (A), the structural unit (B), and the structural unit (C).

The structural unit (B) is not particularly limited and may be any unit derived from a diol, and specific examples of the structural unit (B) include units derived from the following diols: ethylene glycol, trimethylene glycol, 1,4-butanediol, 1,5-pentanediol, 1,6-hexanediol, diethylene glycol, propylene glycol, neopentyl glycol, 1,3-cyclohexanedimethanol, 1,4-cyclohexanedimethanol, 1,2-decahydronaphthalenedimethanol, 1,3-decahydronaphthalenedimethanol, 1,4-decahydronaphthalenedimethanol, 1,5-decahydronaphthalenedimethanol, 1,6-decahydronaphthalenedimethanol, 2,7-decahydronaphthalenedimethanol, tetralindimethanol, norbornanedimethanol, tricyclodecanedimethanol, pentacyclopentadecanedimethanol, decahydro-1,4:5,8-dimethanonaphthalenedimethanol, norbornanediol, cyclohexanediol, 2,2'-bis(4-hydroxycyclohexyl)propane, adamantanediol, decahydro-1,4:5,8-dimethanonaphthalenediol, 9,9-bis[4-(2-hydroxyethoxy)phenyl]fluorene, 9,9-bis[4-(2-hydroxypropoxy)phenyl]fluorene, 9,9-bis[4-(2-hydroxyethoxy)-3-methylphenyl]fluorene, 9,9-bis[4-(2-hydroxypropoxy)-3-methylphenyl]fluorene, 9,9-bis[4-(2-hydroxyethoxy)-3,5-dimethylphenyl]fluorene, 9,9-bis[4-(2-hydroxyethoxy)-3-phenylphenyl]fluorene, 9,9-bis[4-(2-hydroxypropoxy)-3-phenylphenyl]fluorene, 9,9-bis[6-(2-hydroxyethoxy)-2-naphthyl]fluorene, 9,9-bis[6-(2-hydroxypropoxy)-2-naphthyl]fluorene, 9,9-bis(2-hydroxyethyl)fluorene, xylylene glycol, 3,9-bis(1,1-dimethyl-2-hydroxyethyl)-2,4,8,10-tetraoxaspiro[5.5]undecane, 1,4:3,6-dianhydro-D-sorbitol, and 2,2,4,4-tetramethyl-1,3-cyclobutanediol.

The structural unit (B) is preferably a unit derived from an aliphatic diol or a diol having a fluorene structure in order to obtain good optical characteristics. The unit derived from a diol having a fluorene structure more preferably has a cardo structure in addition to the fluorene structure. The unit derived from an aliphatic diol is more preferably a unit derived from 1,4-cyclohexanedimethanol, ethylene glycol, 3,9-bis(1,1-dimethyl-2-hydroxyethyl)-2,4,8,10-tetraoxaspiro[5.5]undecane, 1,4:3,6-dianhydro-D-sorbitol, or decahydro-1,4:5,8-dimethanonaphthalenedimethanol. The unit derived from a diol having a fluorene structure is more preferably a unit derived from 9,9-bis[4-(2-hydroxyethoxy)phenyl]fluorene, 9,9-bis[4-(2-hydroxyethoxy)-3-methylphenyl]fluorene, or 9,9-bis[4-(2-hydroxyethoxy)-3-phenylphenyl]fluorene. The optical isomerism of these diols is not particularly limited, and they may be a cis isomer, a trans isomer, or a mixture thereof.

One of the above units may be contained alone, or two or more of the above units may be contained in combination.

The structural unit (C) is not particularly limited and may be any unit derived from a dicarboxylic acid or an ester-forming derivative of the dicarboxylic acid. Specific examples of the unit (C) include: structural units derived from aromatic dicarboxylic acids such as terephthalic acid, isophthalic acid, phthalic acid, 1,3-naphthalenedicarboxylic acid, 1,4-naphthalenedicarboxylic acid, 1,5-naphthalenedicarboxylic acid, 2,6-naphthalenedicarboxylic acid, 2,7-naphthalenedicarboxylic acid, 2-methylterephthalic acid, biphenyldicarboxylic acid, and tetralindicarboxylic acid and/or derivatives of these aromatic dicarboxylic acids; units derived from aliphatic dicarboxylic acids such as succinic acid, glutaric acid, adipic acid, pimelic acid, suberic acid, azelaic acid, sebacic acid, decanedicarboxylic acid, dodecanedicarboxylic acid, cyclohexanedicarboxylic acid, decalindicarboxylic acid, norbornanedicarboxylic acid, tricyclodecanedicarboxylic acid, pentacyclopentadecanedicarboxylic acid, 3,9-bis(1,1-dimethyl-2-carboxyethyl)-2,4,8,10-tetraoxaspiro[5.5]undecane, 5-carboxy-5-ethyl-2-(1,1-dimethyl-2-carboxyethyl)-1,3-dioxane, 1,4:5,8-dimethanodecahydronaphthalenedicarboxylic acid, adamantanedicarboxylic acid, and dimer acids and/or derivatives of these aliphatic dicarboxylic acids; and units derived from dicarboxylic acids having a cardo structure such as 9,9-bis(carboxymethyl)fluorene, 9,9-bis(1-carboxyethyl)fluorene, 9,9-bis(2-carboxyethyl)fluorene, 9,9-bis(1-carboxypropyl)fluorene, 9,9-bis(2-carboxypropyl)fluorene, 9,9-bis(2-carboxy-1-methylethyl)fluorene, 9,9-bis(2-carboxy-1-methylpropyl)fluorene, 9,9-bis(2-carboxybutyl)fluorene, 9,9-bis(2-carboxy-1-methylbutyl)fluorene, and 9,9-bis(5-carboxypentyl)fluorene and/or derivatives of these dicarboxylic acids having a fluorene structure.

In order to obtain good optical characteristics, the structural unit (C) is preferably a unit derived from an aliphatic dicarboxylic acid or an ester-forming derivative thereof or a unit derived from a dicarboxylic acid having a fluorene structure or an ester-forming derivative thereof. The unit derived from a dicarboxylic acid having a fluorene structure or an ester-forming derivative thereof more preferably has a cardo structure in addition to the fluorene structure. The unit derived from an aliphatic dicarboxylic acid or an ester-forming derivative thereof is more preferably a unit derived from dimethyl 1,4-cyclohexanedicarboxylate from the viewpoint of the property balance of transparency, heat resistance, and optical characteristics. The unit derived from a dicarboxylic acid having a fluorene structure or an ester-forming derivative thereof is more preferably a unit derived from 9,9-bis(methoxycarbonylmethyl)fluorene, 9,9-bis(2-methoxycarbonylethyl)fluorene, or 9,9-bis(methoxycarbonylpropyl)fluorene from the viewpoint of the property balance of transparency, heat resistance, and optical characteristics. The optical isomerism of these dicarboxylic acids and derivatives thereof is not particularly limited, and they may be a cis isomer, a trans isomer, or a mixture thereof.

One of the above units may be contained alone, or two or more of the above units may be contained in combination.

In the present embodiment, the polyester resin may contain a hydroxyl group and a unit other than the units (A) to (C), and the other unit is, for example, a unit (A1) derived from a carboxylic acid or an ester-forming derivative thereof. The unit (A1) is not particularly limited, and examples thereof include units derived from oxyacids such as glycolic acid, lactic acid, hydroxybutyric acid, 2-hydroxyisobutyric acid, hydroxybenzoic acid, 6-hydroxycaproic acid, and 4-hydroxycyclohexanecarboxylic acid and/or derivatives of these oxyacids.

In the present embodiment, the glass transition temperature (Tg) of the polyester resin is not particularly limited as long as the effect of the present invention is obtained. In order to obtain sufficient heat resistance, the glass transition temperature (Tg) is preferably 90° C. or higher, more preferably 95° C. or higher, and even more preferably 100° C. or higher. The upper limit is not particularly limited and is, for example, 240° C. The Tg can be measured by the method described in Examples below. The Tg can be adjusted within the above range, for example, by appropriately adjusting the proportions of starting monomers for the polyester resin in copolymerization.

In the present embodiment, the amount of heat generated by the polyester resin at cooling crystallization is not particularly limited as long as the effect of the present invention is obtained. In order to obtain sufficient transparency, the amount of heat generated at cooling crystallization is preferably 5 J/g or less, more preferably 1 J/g or less, and even more preferably 0.3 J/g or less. The lower limit is not particularly limited and is, for example, 0 J/g. The amount of heat generated at cooling crystallization can be measured by the method described in Examples below. The amount of heat generated at cooling crystallization can be adjusted within the above range, for example, by appropriately adjusting the proportions of starting monomers for the polyester resin in copolymerization.

In the present embodiment, the absolute value of the photoelastic coefficient of an optical film including the polyester resin is not particularly limited as long as the effect of the present invention is obtained. In order to obtain sufficient optical characteristics, the absolute value of the photoelastic coefficient is preferably $40 \times 10^{-12}$ $Pa^{-1}$ or less, more preferably $35 \times 10^{-12}$ $Pa^{-1}$ or less, and even more preferably $30 \times 10^{-12}$ $Pa^{-1}$ or less. The lower limit is not particularly limited and is, for example, $0.01 \times 10^{-12}$ $Pa^{-1}$. The absolute value of the photoelastic coefficient can be measured by the method described in Examples below. The absolute value of the photoelastic coefficient can be adjusted within the above range, for example, by appropriately adjusting the proportions of starting monomers for the polyester resin.

When the polyester resin of the present embodiment is used, it is suitable to add a known additive such as an antioxidant, a release agent, an ultraviolet absorber, a flowability improver, a crystal nucleating agent, a toughener, a dye, an anti-static agent, or an anti-microbial agent.

[Method of Producing Polyester Resin]

The polyester resin can be obtained by homopolymerization of a monomer corresponding to the unit (A) or by copolymerization of monomers corresponding to the units (A) to (C). The following will describe a method of producing a monomer corresponding to the unit (A). Such a monomer is represented, for example, by the following formula (2).

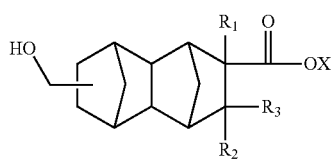

In the formula (2), $R_1$ is a hydrogen atom, $CH_3$, or $C_2H_5$, $R_2$ and $R_3$ are each independently a hydrogen atom or $CH_3$, X is a hydrogen atom or a hydrocarbon group having four or less carbon atoms and optionally containing a hydroxyl group.

In the formula (2), $R_1$ is preferably a hydrogen atom or $CH_3$. $R_2$ and $R_3$ are preferably hydrogen atoms. Examples of the hydrocarbon group include, but are not limited to, methyl, ethyl, propyl, butyl, vinyl, 2-hydroxyethyl, and 4-hydroxybutyl groups.

The compound of the formula (2) in the present embodiment can be synthesized, for example, by a route of the following formula (I) using dicyclopentadiene or cyclopentadiene and a functional group-containing olefin as starting materials.

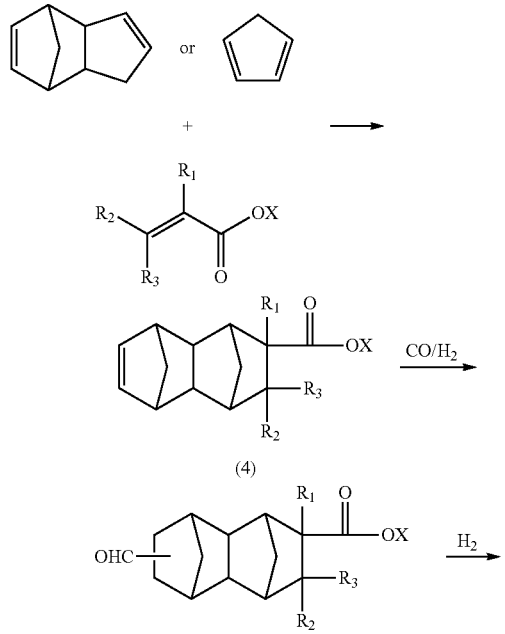

In the formula (I), $R_1$ is a hydrogen atom, $CH_3$, or $C_2H_5$, $R_2$ and $R_3$ are each independently a hydrogen atom or $CH_3$, X is a hydrogen atom or a hydrocarbon group having four or less carbon atoms and optionally containing a hydroxyl group.

[Production of $C_{13}$ to $C_{21}$ Monoolefin of Formula (4) in Formula (I)]

The $C_{13}$ to $C_{21}$ monoolefin of the formula (4) can be produced, for example, by a Diels-Alder reaction between a functional group-containing olefin and dicyclopentadiene.

Specific examples of the functional group-containing olefin used for the Diels-Alder reaction include, but are not limited to, methacrylic acid, methyl methacrylate, ethyl methacrylate, propyl methacrylate, butyl methacrylate, vinyl methacrylate, 2-hydroxyethyl methacrylate, 4-hydroxybutyl methacrylate, acrylic acid, methyl acrylate, ethyl acrylate, propyl acrylate, butyl acrylate, vinyl acrylate, 2-hydroxyethyl acrylate, 4-hydroxybutyl acrylate, crotonic acid, methyl crotonate, ethyl crotonate, 3-methylcrotonic acid, methyl 3-methylcrotonate, and ethyl 3-ethylcrotonate. Preferred olefins include methacrylic acid, methyl methacrylate, 2-hydroxyethyl methacrylate, acrylic acid, methyl acrylate, and 2-hydroxyethyl acrylate. More preferred olefins include methyl methacrylate and methyl acrylate.

Examples of the functional group-containing olefin used for the Diels-Alder reaction further include acrylonitrile, methacrylonitrile, acrolein, and methacrolein. With the use of such an olefin as a starting material, for example, a monoolefin of formula (4') can be produced by the route of the following formula (II) or (III).

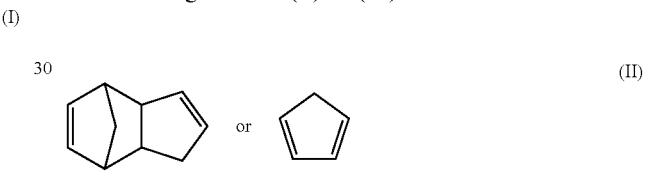

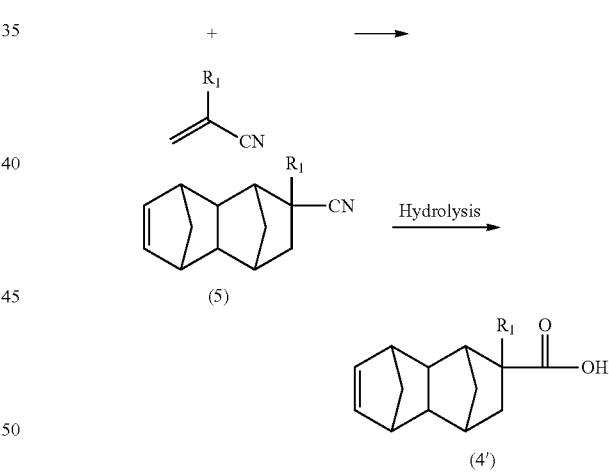

In the formula (II), $R_1$ is a hydrogen atom or $CH_3$.

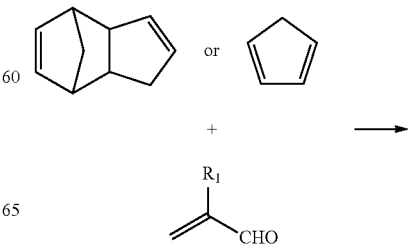

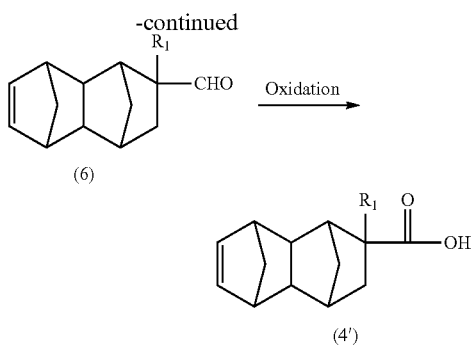

(6)

(4')

In the formula (III), $R_1$ is a hydrogen atom or $CH_3$.

The dicyclopentadiene used for the Diels-Alder reaction is preferably highly pure, and the contents of butadiene, isoprene, and other substances are preferably reduced. The purity of the dicyclopentadiene is preferably 90% or more and more preferably 95% or more. Dicyclopentadiene is prone to be depolymerized into cyclopentadiene (so-called monocyclopentadiene) under heating conditions, and it is thus possible to use cyclopentadiene instead of dicyclopentadiene. The $C_{13}$ to $C_{21}$ monoolefin of the formula (4) is thought to be produced substantially via a $C_8$ to $C_{16}$ monoolefin of the following formula (7) (product of first Diels-Alder reaction), and the produced monoolefin of the formula (7) is thought to act as a new diene-reactive compound (dienophile) which is involved in a Diels-Alder reaction (second Diels-Alder reaction) with cyclopentadiene (diene) present in the reaction system to produce the $C_{13}$ to $C_{21}$ monoolefin of the formula (4)

In view of these points, for example, the $C_{13}$ to $C_{21}$ monoolefin of the formula (4) or the $C_8$ to $C_{16}$ monoolefin of the formula (7) can be selectively obtained by appropriately controlling the reaction conditions of the first Diels-Alder reaction in the reaction route of the formula (I).

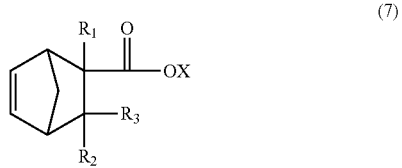

(7)

In the formula (7), $R_1$ is a hydrogen atom, $CH_3$, or $C_2H_5$, $R_2$ and $R_3$ are each independently a hydrogen atom or $CH_3$, X is a hydrogen atom or a hydrocarbon group having four or less carbon atoms and optionally containing a hydroxyl group.

In order to allow the two-step Diels-Alder reaction to proceed efficiently, i.e., in order to selectively obtain the $C_{13}$ to $C_{21}$ monoolefin of the formula (4), the presence of cyclopentadiene in the reaction system is important. Therefore, the reaction temperature is preferably 100° C. or higher, more preferably 120° C. or higher, and even more preferably 130° C. or higher. In order to selectively obtain the $C_8$ to $C_{16}$ monoolefin of the formula (7), the reaction temperature is preferably lower than 180° C. In either case, the reaction is preferably carried out at a temperature of 250° C. or lower in order to inhibit formation of a high-boiling substance as a by-product.

The $C_{13}$ to $C_{21}$ monoolefin of the formula (4) obtained as described above can be subjected to a hydroformylation reaction and reduction reaction as described below to obtain a monomer corresponding to the unit of the formula (1) wherein n=1 (i.e., a compound of the formula (2)). The $C_8$ to $C_{16}$ monoolefin of the formula (7) obtained as described above can be subjected to a similar hydroformylation reaction and reduction reaction to obtain a monomer corresponding to the unit of the formula (1) wherein n=0 (i.e., a compound of the formula (8)).

A hydrocarbon, an alcohol, or an ester can also be used as the reaction solvent and, for example, aliphatic hydrocarbons having 6 or more carbon atoms, cyclohexane, toluene, xylene, ethylbenzene, mesitylene, propanol, and butanol are preferred. A known catalyst such as $AlCl_3$ may be added if necessary.

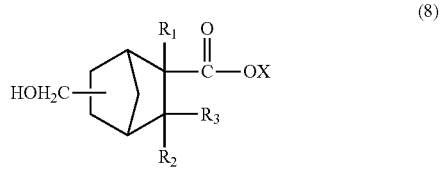

(8)

In the formula (8), $R_1$ is a hydrogen atom, $CH_3$, or $C_2H_5$, $R_2$ and $R_3$ are each independently a hydrogen atom or $CH_3$, and X is a hydrogen atom or a hydrocarbon group having four or less carbon atoms and optionally containing a hydroxyl group.

The Diels-Alder reaction can be conducted in various reaction modes such as a batch mode using a tank reactor or like means, a semibatch mode in which a substrate or substrate solution is supplied to a tank reactor under predetermined reaction conditions, and a continuous flow mode in which a substrate is made to flow in a tubular reactor under predetermined reaction conditions.

The reaction product as obtained by the Diels-Alder reaction may directly be used as a starting material for the hydroformylation reaction or may be purified by a technique such as distillation, extraction, or crystallization prior to being subjected to the subsequent step.

[Production of $C_{14}$ to $C_{22}$ Difunctional Compound of Formula (3) in Formula (I)]

The $C_{14}$ to $C_{22}$ difunctional compound of the formula (3) in the formula (I) can be produced, for example, by subjecting the $C_{13}$ to $C_{21}$ monoolefin of the formula (4), carbon monoxide gas, and hydrogen gas to a hydroformylation reaction in the presence of a rhodium compound and an organophosphorus compound.

The rhodium compound used in the hydroformylation reaction may be any compound which forms a complex with an organophosphorus compound and which exhibits hydroformylation activity in the presence of carbon monoxide and hydrogen, and the form of the precursor of the rhodium compound is not particularly limited. For example, a catalyst precursor such as dicarbonylacetylacetonato rhodium (hereinafter referred to as "Rh(acac) $(CO)_2$"), $Rh_2O_3$, $Rh_4(CO)_{12}$, $Rh_6(CO)_{16}$, or $Rh(NO_3)_3$ may be introduced, together with an organophosphorus compound, into a reaction mixture, and thus a rhodium carbonyl hydride-phosphorus complex having catalytic activity may be formed in a reaction vessel. Alternatively, a rhodium carbonyl hydride-phosphorus complex may be prepared beforehand, and the prepared complex may be introduced into a reactor. A specific example of preferred methods is a method in which Rh(acac) $(CO)_2$ is reacted with an organophosphorus compound in the presence of a solvent and then the reaction product is introduced together with excess of the organophosphorus compound into a reactor so as to give a rhodium-organophosphorus complex having catalytic activity.

Investigations by the present inventors have revealed that a two-step Diels-Alder reaction product as represented by the formula (4) which has an internal olefin with a relatively high molecular weight can be hydroformylated with an extremely small amount of rhodium catalyst. The amount of the rhodium compound used in the hydroformylation reaction is preferably 0.1 to 60 micromoles, more preferably 0.1 to 30 micromoles, even more preferably 0.2 to 20 micromoles, and particularly preferably 0.5 to 10 micromoles, based on 1 mole of the $C_{13}$ to $C_{21}$ monoolefin of the formula (4) which is a substrate in the hydroformylation reaction. When the amount of the rhodium compound used is less than 60 micromoles based on 1 mole of the $C_{13}$ to $C_{21}$ monoolefin, it can be considered that there is no practical need for any installation for collecting and recycling the rhodium complex. Thus, the present embodiment enables reduction in economic burden associated with collecting/recycling installations, thereby allowing reduction in cost associated with rhodium catalysts.

The organophosphorus compound which forms the hydroformylation reaction catalyst for the hydroformylation reaction in the present embodiment together with the rhodium compound is not particularly limited, and examples of the organophosphorus compound include a phosphine of the formula $P(-R_a)(-R_b)(-R_c)$ and a phosphite of the formula $P(-OR_a)(-OR_b)(-OR_c)$. Specific examples of $R_a$, $R_b$, and $R_c$ include, but are not limited to, an aryl group which may be substituted with a $C_1$ to $C_4$ alkyl or alkoxy group and an alicyclic alkyl group which may be substituted with a $C_1$ to $C_4$ alkyl or alkoxy group. Triphenylphosphine and triphenyl phosphite are suitably used. The amount of the organophosphorus compound used is preferably 300 to 10000 times, more preferably 500 to 10000 times, even more preferably 700 to 5000 times, particularly preferably 900 to 2000 times, the amount of rhodium atoms in the rhodium compound on a molar basis. When the amount of the organophosphorus compound used is 300 or more times the amount of rhodium atoms on a molar basis, sufficient stability of the rhodium carbonyl hydride-phosphorus complex serving as a catalytically active material tends to be obtained, with the result that good reactivity tends to be obtained. The reason why the amount of the organophosphorus compound used is preferably 10000 or less times the amount of rhodium atoms on a molar basis is that in this case the cost spent on the organophosphorus compound can be sufficiently reduced.

The hydroformylation reaction can be carried out without the use of any solvent. However, with the use of a solvent inert in the reaction, the reaction can be accomplished in a more preferred manner. The solvent used in the hydroformylation reaction is not particularly limited and can be any solvent capable of dissolving the $C_{13}$ to $C_{21}$ monoolefin of the formula (4), dicyclopentadiene or cyclopentadiene, the rhodium compound, and the organophosphorus compound. Specific examples of the solvent include, but are not limited to: hydrocarbons such as aliphatic hydrocarbons, alicyclic hydrocarbons, and aromatic hydrocarbons; esters such as aliphatic esters, alicyclic esters, and aromatic esters; alcohols such as aliphatic alcohols and alicyclic alcohols; and solvents such as aromatic halides. Among these, hydrocarbons are suitably used and, in particular, alicyclic hydrocarbons and aromatic hydrocarbons are more suitably used.

The temperature during the hydroformylation reaction is preferably 40° C. to 160° C. and more preferably 80° C. to 140° C. When the reaction temperature is 40° C. or higher, a sufficient reaction rate tends to be achieved, and the monoolefin as a starting material tends to be prevented from remaining unreacted. Setting the reaction temperature to 160° C. or lower tends to reduce formation of by-products derived from the starting monoolefin or the reaction product and effectively prevent decrease in reaction performance.

The hydroformylation reaction in the present embodiment is preferably carried out under pressurization with carbon monoxide (occasionally referred to as "CO" hereinafter) gas and hydrogen (occasionally referred to as "$H_2$" hereinafter) gas. In this case, the CO and $H_2$ gases can be each independently introduced into the reaction system or can be introduced into the reaction system together in the form of a mixed gas prepared beforehand. The molar ratio between the CO and $H_2$ gases (=CO/$H_2$) introduced into the reaction system is preferably 0.2 to 5, more preferably 0.5 to 2, and even more preferably 0.8 to 1.2. When the molar ratio between the CO and $H_2$ gasses is adjusted within the above range, the activity of the hydroformylation reaction or the selectivity to the intended aldehyde tends to be increased. The amount of the CO and $H_2$ gases introduced into the reaction system decreases as the reaction proceeds, and thus the use of a CO/$H_2$ mixed gas prepared beforehand may facilitate the reaction control.

The reaction pressure in the hydroformylation reaction is preferably 1 to 12 MPa, more preferably 1.2 to 9 MPa, and even more preferably 1.5 to 5 MPa. Setting the reaction pressure to 1 MPa or more tends to provide a sufficient reaction rate, and tends to sufficiently prevent the monoolefin as a starting material from remaining unreacted. Setting the reaction pressure to 12 MPa or less eliminates the need for any expensive installation having high pressure resistance and is therefore economically advantageous. In particular, when the reaction is carried out in a batch mode or semibatch mode which involves depressurization by discharge of the CO and $H_2$ gases after completion of the reaction, a lower reaction pressure causes a smaller loss of the CO and $H_2$ gases and is therefore more economically advantageous.

The suitable reaction mode of the hydroformylation reaction is a batch reaction or semibatch reaction. The semibatch reaction can be carried out by placing the rhodium compound, the organophosphorus compound, and the solvent in a reactor, creating the previously described reaction conditions through pressurization with a CO/$H_2$ gas and/or heating, and then supplying the monoolefin as a starting material or a solution of the monoolefin to the reactor.

The reaction product as obtained by the hydroformylation reaction may directly be used as a starting material for the subsequent reduction reaction or may be purified by distillation, extraction, or crystallization prior to being subjected to the subsequent step.

[Production of $C_{14}$ to $C_{22}$ Compound of Formula (2)]

The $C_{14}$ to $C_{22}$ compound of the formula (2) in the formula (I) can be produced by a reduction reaction of the $C_{14}$ to $C_{22}$ compound of the formula (3) in the presence of a catalyst having hydrogenation activity and hydrogen.

In the reduction reaction, a catalyst containing at least one element selected from the group consisting of copper, chromium, iron, zinc, aluminum, nickel, cobalt, and palladium is preferably used as the catalyst having hydrogenation activity. Examples of more preferred catalysts include a Cu—Cr catalyst, a Cu—Zn catalyst, and a Cu—Zn—Al catalyst and further include a Raney-Ni catalyst and a Raney-Co catalyst. A Cu—Cr catalyst and a Raney-Co catalyst are even more preferred.

The amount of the hydrogenation catalyst used is 1 to 100% by mass, preferably 2 to 50% by mass, and more preferably 5 to 30% by mass based on the $C_{14}$ to $C_{22}$ compound of the formula (3) which is a substrate. Setting the amount of the catalyst used within these ranges enables the hydrogenation reaction to take place in a suitable manner. When the amount of the catalyst used is 1% by mass or more, the reaction tends to be achieved sufficiently to obtain a sufficient yield of the intended product. When the amount of the catalyst used is 100% by mass or less, a good balance tends to be established between the amount of the catalyst used for the reaction and the increasing effect on the reaction rate.

The reaction temperature in the reduction reaction is preferably 60 to 200° C. and more preferably 80° C. to 150° C. Setting the reaction temperature to 200° C. or lower tends to prevent the occurrence of side reaction or decomposition reaction and give the intended product in a high yield. Setting the reaction temperature to 60° C. or higher tends to allow completion of the reaction in a moderate period of time and enable avoidance of decrease in productivity or decrease in yield of the intended product.

The reaction pressure in the reduction reaction, as expressed by a hydrogen partial pressure, is preferably 0.5 to 10 MPa and more preferably 1 to 5 MPa. Setting the hydrogen partial pressure to 10 MPa or less tends to prevent the occurrence of side reaction or decomposition reaction and give the intended product in a high yield. Setting the hydrogen partial pressure to 0.5 MPa or more tends to allow completion of the reaction in a moderate period of time and enable avoidance of decrease in productivity or decrease in yield of the intended product. In the reduction reaction, an inert gas (such as nitrogen or argon) may be additionally present.

In the reduction reaction, a solvent can be used. Examples of the solvent used in the reduction reaction include aliphatic hydrocarbons, alicyclic hydrocarbons, aromatic hydrocarbons, and alcohols, among which alicyclic hydrocarbons, aromatic hydrocarbons, and alcohols are preferred. Specific examples of the solvent include cyclohexane, toluene, xylene, methanol, ethanol, and 1-propanol.

The reduction reaction can be conducted in various reaction modes such as a batch mode using a tank reactor or like means, a semibatch mode in which a substrate or substrate solution is supplied to a tank reactor under predetermined reaction conditions, and a continuous flow mode in which a substrate or substrate solution is made to flow in a tubular reactor filled with a forming catalyst under predetermined reaction conditions.

The reaction product obtained by the reduction reaction can be purified, for example, by distillation, extraction, or crystallization.

The method used in the present embodiment to copolymerize the compound of the formula (2) or the compound of the formula (8) as a monomer corresponding to the unit (A) with other monomers corresponding to the units (B) and (C) is not particularly limited, and a conventionally known method for producing polyester can be employed. Examples of the method include: melt polymerization methods such as transesterification and direct esterification; and solution polymerization methods.

For production of the polyester resin of the present embodiment, a catalyst used for production of common polyester resins, such as a transesterification catalyst, an esterification catalyst, or a polycondensation catalyst, may be used. The catalyst is not particularly limited, and examples thereof include: compounds (e.g., fatty acid salts, carbonic acid salts, phosphoric acid salts, hydroxides, chlorides, oxides, and alkoxides) of metals such as zinc, lead, cerium, cadmium, manganese, cobalt, lithium, sodium, potassium, calcium, nickel, magnesium, vanadium, aluminum, titanium, antimony, germanium, and tin; and metallic magnesium. These may be used alone, or two or more thereof may be used in combination. Among the above examples, preferred catalysts are compounds of manganese, cobalt, zinc, titanium, calcium, antimony, germanium, and tin. Compounds of manganese, titanium, antimony, germanium, and tin are more preferred. The amount of such a catalyst used is not particularly limited. The catalyst amount on a metal component basis is preferably 1 to 1000 ppm, more preferably 3 to 750 ppm, and even more preferably 5 to 500 ppm based on the starting materials for the polyester resin.

The reaction temperature in the polymerization reaction depends on the type and amount of the catalyst used and is typically selected in the range of 150° C. to 300° C. From the viewpoint of the reaction rate and coloring of the resulting resin, the reaction temperature is preferably 180° C. to 280° C. It is preferable that the pressure inside the reaction tank be initially atmospheric pressure and finally controlled to 1 kPa or less, more preferably to 0.5 kPa or less.

For the polymerization reaction, a phosphorus compound may be added if desired. Examples of the phosphorus compound include, but are not limited to, phosphoric acid, phosphorous acid, phosphoric acid esters, and phosphorous acid esters. Examples of the phosphoric acid esters include, but are not limited to, methyl phosphate, ethyl phosphate, butyl phosphate, phenyl phosphate, dimethyl phosphate, diethyl phosphate, dibutyl phosphate, diphenyl phosphate, trimethyl phosphate, triethyl phosphate, tributyl phosphate, and triphenyl phosphate. Examples of the phosphorous acid esters include, but are not limited to, methyl phosphite, ethyl phosphite, butyl phosphite, phenyl phosphite, dimethyl phosphite, diethyl phosphite, dibutyl phosphite, diphenyl phosphite, trimethyl phosphite, triethyl phosphite, tributyl phosphite, and triphenyl phosphite. These may be used alone, or two or more thereof may be used in combination. The concentration of phosphorus atoms in the copolymerized polyester resin of the present embodiment is preferably 1 to 500 ppm, more preferably 5 to 400 ppm, and even more preferably 10 to 200 ppm.

For production of the polyester resin of the present embodiment, an etherification inhibitor, a stabilizer such as a thermal stabilizer or light stabilizer, and a polymerization modifier can be used.

Various additives and a forming aid can be added to the polyester resin of the present embodiment as long as the purpose of the present embodiment is not impaired, and examples of the additives include an antioxidant, a light stabilizer, an ultraviolet absorber, a plasticizer, an extender, a delustrant, a drying regulator, an anti-static agent, an anti-settling agent, a surfactant, a flow modifier, a drying oil, a wax, a filler, a colorant, a reinforcing agent, a surface smoothing agent, a leveling agent, a curing accelerator, and a thickener.

The polyester resin of the present embodiment may be in the form of a resin composition further containing a resin other than the polyester resin in the present embodiment, as long as the intended effect of the present embodiment is not impaired. The other resin which may be further contained is not particularly limited and is, for example, at least one resin selected from the group consisting of polyester resins other than the polyester resin in the present embodiment, polycarbonate resins, (meth)acrylic resins, polyamide resins, polystyrene resins, cycloolefin resins, acrylonitrile-butadiene-styrene copolymer resins, vinyl chloride resins, polyphenylene ether resins, polysulfone resins, polyacetal resins, and methyl methacrylate-styrene copolymer resins. These resins can be known resins, and one of these resins or a combination of two or more of these resins may be added to the resin composition.

[Optical Film and Method of Producing the Same]

The method of producing the optical film of the present invention is preferably a method that yields a highly uniform thickness and avoids formation of gel, fish eye, and scratch and that results in a minimal content of foreign matter. Examples of the method include known methods such as solution casting, melt extrusion, calendering, and hot press molding. The method used to stretch the film can also be a known method, and longitudinal uniaxial stretching, transverse uniaxial stretching, multi-step stretching, or simultaneous biaxial stretching may be used.

The optical film of the present invention has superior transparency and preferably has a haze of 3% or less and a total light transmittance of 85% or more. The stretching ratio in the stretching process can be arbitrarily chosen and is preferably 1.1 to 5 and more preferably 1.2 to 3. The stretching temperature is preferably in the range of Tg–30° C. to Tg+50° C. and more preferably in the range of Tg–20° C. to Tg+30° C., where Tg is the glass transition temperature. The thickness of the optical film is not particularly limited and is typically in the range of 1 to 250 μm, preferably in the range of 5 to 200 μm, more preferably in the range of 10 to 150 μm, and even more preferably in the range of 15 to 100 μm.

[Retardation Film]

When the optical film of the present invention is used as a retardation film, the refractive indices in the directions of the X-, Y-, and Z-axes can be controlled by uniaxial stretching or biaxial stretching to achieve improvement in viewing angle. A plurality of the optical films may be used to obtain desired optical characteristics. For example, a half-wavelength plate and a quarter-wavelength plate may be produced and attached together at an appropriate angle to form a broadband quarter-wavelength film. Likewise, half-wavelength plates may be attached together at an appropriate angle to form a broadband half-wavelength plate.

[Polarizing Plate]

The optical film of the present invention can be attached to a polarizing plate or a polarizing film via an adhesive layer or a bonding layer to form a viewing angle-widening film, a circularly polarizing plate, or an elliptically polarizing plate. The viewing angle-widening film can be used in a liquid crystal display device. The circularly polarizing plate can be suitably used as an anti-reflection film, for example, in an organic or inorganic electroluminescence display device or element, a touch panel, a plasm display, a CRT, or a liquid crystal display device. The optical film of the present invention may be used in a liquid crystal display device together with a different retardation film such as an optical compensation film including a polymer liquid crystal or a viewing angle-widening film made by orientation and curing of a discotic liquid crystal.

[Laminate (Laminated Film)]

Depending on the intended use of the optical film of the present invention, a layer (also referred to as "surface layer") having at least one ability selected from the group consisting of hard coat ability, self-restoring ability, anti-glare ability, anti-reflection ability, low-reflection ability, and anti-static ability may be laminated on the film. Examples of the resulting laminate (laminated film) include a hard coat film, an anti-reflection (AR) film, a light diffusion sheet, a prism lens sheet, a transparent conductive film, an infrared absorption film, and an electromagnetic wave absorption film.

[Surface Layer]

The thickness of the surface layer depends on its function, and is preferably in the range of 10 nm to 30 μm and more preferably in the range of 50 nm to 20 μm. If the thickness is below this range, the surface layer has insufficient effect, while if the thickness is beyond the above range, the surface layer adversely affects the optical performance.

The hard coat ability is the ability to increase the hardness of a surface and render the surface resistant to damage. This ability, as evaluated by scratch hardness (pencil method) specified in JIS K 5600-5-4 (1999), is such that the hardness is preferably HB or higher and more preferably 2H or higher. The hard coat ability, as evaluated by an abrasion resistance test (steel wool abrasion resistance test) performed using #0000 steel wool at 200 g/cm$^2$ and 10 reciprocations, is such that the number of scratches is preferably less than 10 and more preferably less than 5.

The self-restoring ability is the ability to resist damage by repairing damage through elastic recovery. This ability is such that when a surface is rubbed with a brass brush under a load of 500 g, the damage is repaired preferably within 3 minutes, more preferably within 1 minute.

The anti-glare ability is the ability to improve visibility by reducing reflected glare of external light through surficial light scattering. This ability is such that a haze as evaluated according to JIS K 7136 (2000) is preferably 2 to 50%, more preferably 2 to 40%, and particularly preferably 2 to 30%.

The anti-reflection ability and the low-reflection ability are the abilities to reduce the reflectance at a surface by light interference and improve the visibility. These abilities, as evaluated by reflectance spectroscopy, are such that the reflectance is preferably 2% or less and particularly preferably 1% or less.

The anti-static ability is the ability to leak and remove triboelectricity generated by separation from a surface or rubbing of a surface. An index of this ability is a surface resistivity as specified in JIS K 6911 (2006), and this surface resistivity is preferably $10^{11}$Ω/□ or less and more preferably $10^9$Ω/□ or less. The provision of the anti-static ability can be achieved by a layer containing a known anti-static agent, and may be achieved by a layer containing a conductive polymer such as polythiophene, polypyrrole, or polyaniline.

[Other Applications]

The applications of the optical film of the present invention are not particularly limited and may be any applications for which the feature of the optical film is beneficial. The optical film can be suitably used not only in a retardation film or polarizing plate but also in optical devices such as a viewing angle-widening film, a liquid crystal display device, an organic or inorganic electroluminescent display device or element, a plasma display, a CRT, a liquid crystal projector, an optical pickup system for an optical recording/reproduction apparatus, a touch panel, and an anti-reflection film.

EXAMPLES

Hereinafter, the present invention will be described in more detail with examples. The scope of the present invention is not limited by the examples.

[Methods for Evaluation of Polyester Resin]

(1) Copolymerization Composition

The copolymerization composition of the polyester resin was determined by measuring $^1$H-NMR and $^{13}$C-NMR spectra and calculating the ratio between the areas of the peaks attributed to the different structural units. The measurement apparatus used was a nuclear magnetic resonance apparatus (available from Bruker BioSpin, product name: AVANCE III 500/Ascend 500), and the measurement was conducted at 500 MHz. The solvent used was deuterated chloroform.

(2) Glass Transition Temperature (Tg)

The glass transition temperature of the polyester resin was measured using a differential scanning calorimeter (available from Shimadzu Corporation, product name: DSC-60/TA-60WS). A measurement sample was prepared by placing 5 to 10 mg of the polyester resin in an unsealed aluminum vessel, heating the polyester resin to 280° C. at a temperature rise rate of 20° C./min under a stream of nitrogen gas (50 mL/min), and rapidly cooling the heated resin. This sample was heated again under the same conditions, and the glass transition temperature was determined as a temperature at which the change in the DSC curve reached ½ of the difference in the baseline before and after transition (middlepoint glass transition temperature).

(3) Amount of Heat Generated at Cooling Crystallization (ΔHc)

The amount of heat generated by the polyester resin at cooling crystallization was calculated from the area of an exothermic peak that appeared during temperature decrease at a rate of 5° C./min after holding at 280° C. for 1 minute following the measurement of Tg.

[Methods for Evaluation of Optical Film]

(1) Photoelastic Coefficient (ε)

A 1 cm×5 cm test piece was cut out from an about 100-μm-thick optical film as described below, and this test piece was used as a measurement sample. An ellipsometer (available from JASCO Corporation, product name: M220) was used to measure birefringence at a wavelength of 632.8 nm with respect to the change in load, and the photoelastic coefficient was calculated from the measurement result.

(2) Wavelength Dispersion of Phase Difference

A 5 cm×5 cm test piece was cut out from an about 100-μm-thick optical film and uniaxially stretched at a stretching ratio of 1.5 at a temperature 15° C. above the glass transition temperature of the resin, and the stretched test piece was used as a measurement sample. An ellipsometer (available from JASCO Corporation, product name: M220) was used to measure the phase difference in the wavelength range from 400 to 800 nm. The ratio between the phase difference values at wavelengths of 450 nm and 550 nm and the ratio between the phase difference values at wavelengths of 550 nm and 650 nm were calculated to evaluate the wavelength dispersion of phase difference.

<Monomer Synthesis Example>

A 500 mL stainless steel reaction vessel was charged with 173 g (2.01 mol) of methyl acrylate and 167 g (1.26 mol) of dicyclopentadiene, which were reacted at 195° C. for 2 hours. The reaction gave a reaction liquid containing 96 g of the monoolefin of the following formula (4a). This liquid was subjected to purification by distillation, and a portion of the purified product was used for the subsequent reaction.

A 300 mL stainless steel reaction vessel was used to allow the distillation-purified monoolefin of the formula (4a) to undergo hydroformylation reaction using a CO/H$_2$ mixed gas (CO/H$_2$ molar ratio=1). Specifically, the reaction vessel was charged with 70 g of the monoolefin of the formula (4a), 140 g of toluene, 0.50 g of triphenyl phosphite, and 550 μL of a separately prepared toluene solution of Rh(acac)(CO)$_2$ (concentration: 0.003 mol/L). After three cycles of purging with nitrogen and three cycles of purging with the CO/H$_2$ mixed gas, the inside of the system was pressurized with the CO/H$_2$ mixed gas, and the reaction was allowed to proceed at 100° C. and 2 MPa for 5 hours. After completion of the reaction, the reaction liquid was analyzed by gas chromatography to confirm that this reaction liquid contained 76 g of the compound of the formula (3a) and 1.4 g of the monoolefin of the formula (4a) (conversion: 98%, selectivity: 97%). The reaction liquid was subjected to purification by distillation, and a portion of the purified product was used for the subsequent reaction.

A 300 mL stainless steel reaction vessel was charged with 54 g of the distillation-purified compound of the formula (3a), 7 mL of a sponge cobalt catalyst (R-400, available from Nikko Rica Corporation), and 109 g of toluene, then the inside of the system was pressurized with hydrogen gas, and the reaction was allowed to proceed at 3 MPa and 100° C. for 9 hours. After the reaction, the resulting slurry was filtered through a membrane filter having a pore size of 0.2 μm to remove the catalyst. After that, the solvent was distilled off using an evaporator, and the resulting product was analyzed by gas chromatography and GC-MS to confirm that the product contained 51 g of the main reaction product of the formula (2a) which has a molecular weight of 250 (main reaction product yield: 93%). Purification by distillation was further conducted to obtain the main reaction product (D-NHEs).

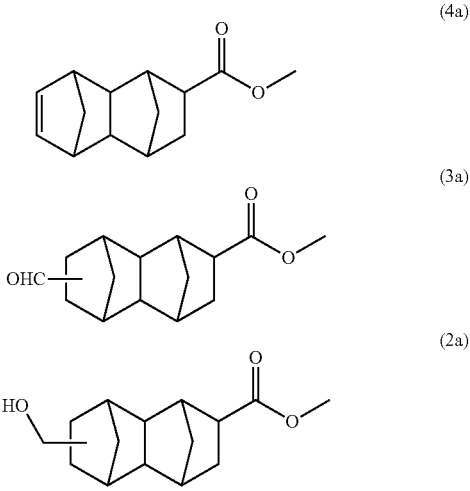

<Identification of Reaction Product>

Figure 2:
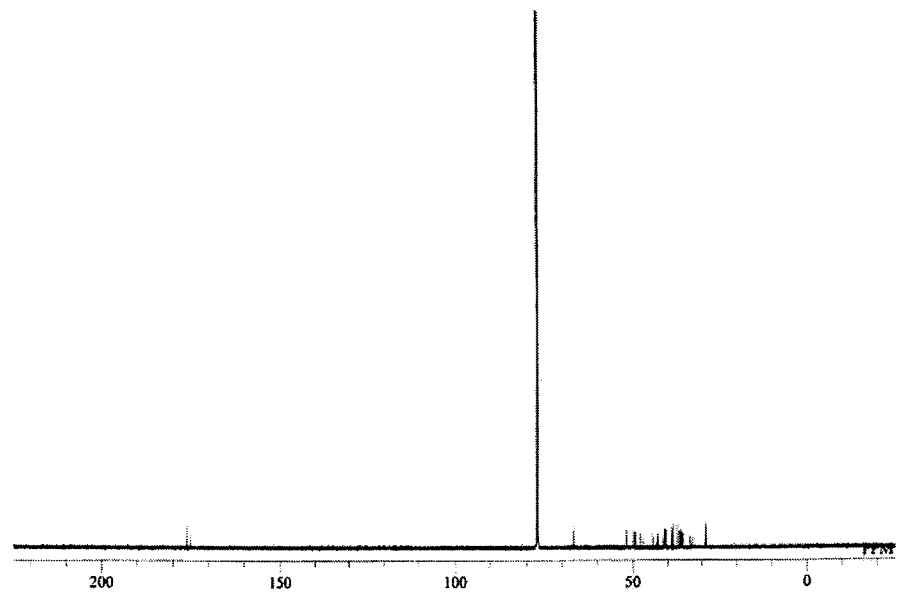
FIG. 2 shows a result of $^{13}$C-NMR measurement of the main reaction product obtained in the monomer synthesis example.
Figure 3:
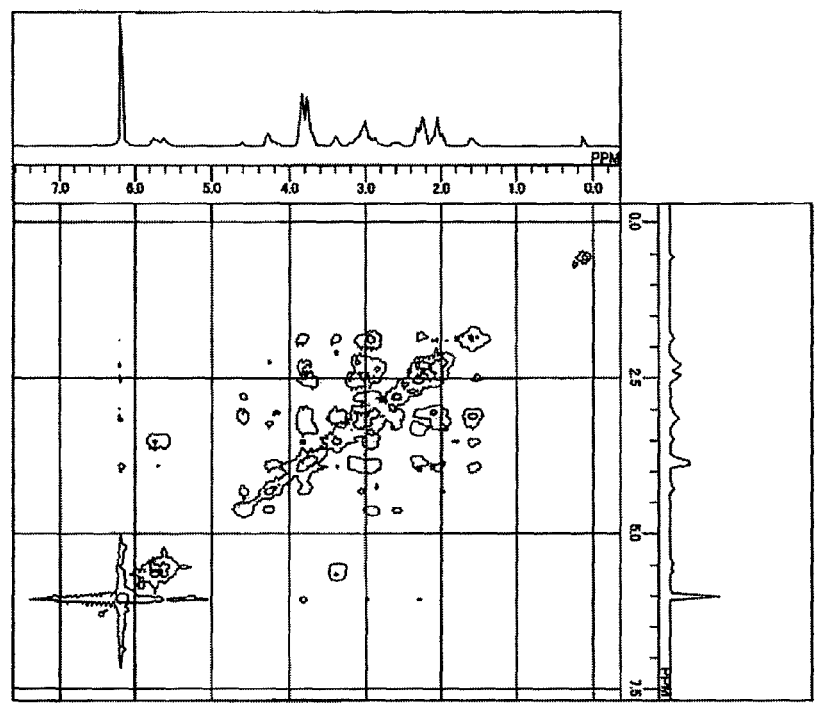
FIG. 3 shows a result of COSY-NMR measurement of the main reaction product obtained in the monomer synthesis example.

The components obtained in the monomer synthesis example were analyzed by NMR. The NMR spectra are shown in FIGS. 1 to 3. The result of GC-MS analysis specified below and the NMR analysis results shown in FIGS. 1 to 3 confirmed that the main reaction product obtained in the monomer synthesis example was the compound of the formula (2a).

<Analysis Method>

1) Conditions of Gas Chromatography Measurement

Analyzer: Capillary gas chromatograph GC-2010 Plus, available from Shimadzu Corporation Analysis column: InertCap1 (30 m, 0.32 mm I.D., thickness: 0.25 μm), available from GL Sciences Inc.

Oven temperature: 60° C. (0.5 minutes)–15° C./min–280° C. (4 minutes)

Detector: FID, temperature: 280° C.

2) Conditions of GC-MS Measurement
  Analyzer: GCMS-QP2010 Plus, available from Shimadzu Corporation
  Ionization voltage: 70 eV
  Analysis column: DB-1 (30 m, 0.32 mm I.D., thickness: 1.00 μm), available from Agilent Technologies
  Oven temperature: 60° C. (0.5 minutes)–15° C./min–280° C. (4 minutes)
3) Conditions of NMR Measurement
  Apparatus: JNM-ECA500 (500 MHz), available from JEOL Ltd.
  Measurement mode: $^{1}$H-NMR, $^{13}$C-NMR, and COSY-NMR
  Solvent: $CDCl_3$ (deuterated chloroform)
  Internal standard: Tetramethylsilane Synthesis of Polyester Resins Examples 1 to 8

A small-sized polyester production apparatus equipped with a stirrer, a heater, a nitrogen inlet tube, and a cold trap was charged with starting monomers and titanium(IV) tetrabutoxide in amounts shown in Table 1. Under a nitrogen atmosphere, the mixture was heated to 240 to 250° C. and stirred. After holding at the raised temperature for 5 hours or more, the temperature was gradually raised in conjunction with gradual pressure reduction. Finally, the temperature was held at 260 to 270° C. while the pressure was held at 0.1 kPa or lower. Once an appropriate melt viscosity was reached, nitrogen was blown into the apparatus to obtain ordinary pressure, and the polyester resin formed was collected.

The results of evaluation of the polyester resins are shown in Table 1.

Comparative Example 1

A polyester production apparatus equipped with a stirrer, a heater, a nitrogen inlet tube, a partial condenser, a total condenser, and a cold trap was charged with starting monomers and tin(II) octylate in amounts shown in Table 1. Under a nitrogen atmosphere, the mixture was heated to 240 to 250° C. and stirred. After holding at the raised temperature for 5 hours or more, the temperature was gradually raised in conjunction with gradual pressure reduction. Finally, the temperature was held at 260 to 270° C. while the pressure was held at 0.1 kPa or lower. Once an appropriate melt viscosity was reached, nitrogen was blown into the apparatus to obtain ordinary pressure, and the polyester resin formed was collected.

The results of evaluation of the polyester resin are shown in Table 1.

Comparative Examples 2 and 3

In Comparative Examples 2 and 3, the following commercially-available products were purchased and evaluated.
  Comparative Example 2: Eastar (registered trademark) 5011 (available from Eastman Chemical Company)
  Comparative Example 3: Iupilon (registered trademark) S-2000 (available from Mitsubishi Engineering-Plastics Corporation)

Production of Optical Films

Examples 1 to 8

Optical films with a thickness of about 100 μm were produced by solution casting. Specifically, the resin was dissolved in dichloromethane to a concentration of 5 wt %, the resin solution was poured onto a mold which was confirmed to be horizontally positioned, and then dichloromethane was gradually evaporated to form a film on the mold. The obtained optical film was separated from the mold and then thoroughly dried using a dryer at a temperature 20° C. below the glass transition temperature.

The results of evaluation of the optical films are shown in Table 1.

Comparative Examples 1 to 3

Optical films with a thickness of 150 to 250 μm were produced by hot press molding. Specifically, 3 g of the resin was placed on a mold and subjected to pressing at a pressure of 50 to 100 kgf/cm$^2$ for 2 minutes using a press molding machine set at a temperature 120 to 140° C. above the glass transition temperature of the resin. After a given period of time, the mold was quickly transferred to a cooling press molding machine in which cooling water was made to flow, and pressing was performed at a pressure of 100 kgf/cm$^2$ for 2 minutes. After a given period of time, the mold was taken out of the cooling press molding machine, and an optical film was obtained.

The obtained optical film was annealed using a dryer at a temperature 20° C. below the glass transition temperature for 10 hours.

When optical film production by solution casting was impossible because of occurrence of blushing during film formation or poor release from the mold, films were produced by hot press molding.

TABLE 1

|  |  |  | Example 1 | Example 2 | Example 3 | Example 4 | Example 5 | Example 6 |
|---|---|---|---|---|---|---|---|---|
| Synthesis of polyester resins | | | | | | | | |
| Amounts of monomers used [g] | Hydroxycarboxylic acid ester | D-NHEs | 11.47 | 9.53 | 7.84 | 1.83 | 11.10 | 9.48 |
|  | Diester | DMCD | 0 | 1.20 | 1.10 | 2.93 | 0 | 0 |
|  |  | FDPM | 0 | 0 | 0 | 0 | 1.88 | 3.02 |
|  |  | DMT | 0 | 0 | 0 | 0 | 0 | 0 |
|  | Diol | CHDM | 0 | 0.88 | 0 | 0 | 0.84 | 1.32 |
|  |  | EG | 0 | 0 | 0 | 0 | 0 | 0 |
|  |  | BPEF | 0 | 0 | 2.55 | 6.53 | 0 | 0 |
| Amounts of catalysts used | Titanium(IV) tetrabutoxide | | 7.11 | 4.99 | 4.99 | 4.98 | 5.99 | 5.98 |
|  | Tin(II) octylate | | 0 | 0 | 0 | 0 | 0 | 0 |

TABLE 1-continued

Evaluation results (polyester resins)

| Copolymerization composition [mol %] | Hydroxycarboxylic acid unit = Unit (A) | D-NHEs | 100 | 76 | 74 | 20 | 81 | 69 |
|---|---|---|---|---|---|---|---|---|
| | Dicarboxylic acid unit = Unit (C) | DMCD | 0 | 12 | 13 | 40 | 0 | 0 |
| | | FDPM | 0 | 0 | 0 | 0 | 9.5 | 15.5 |
| | | DMT | 0 | 0 | 0 | 0 | 0 | 0 |
| | Diol unit = Unit (B) | CHDM | 0 | 12 | 0 | 0 | 9.5 | 15.5 |
| | | EG | 0 | 0 | 0 | 0 | 0 | 0 |
| | | BPEF | 0 | 0 | 13 | 40 | 0 | 0 |
| Glass transition temperature (Tg) [° C.] | | | 175 | 150 | 159 | 140 | 152 | 142 |
| Amount of heat generated at cooling crystallization (ΔHc) [J/g] | | | 0 | 0 | 0 | 0 | 0 | 0 |

Evaluation results (optical films)

| Photoelastic coefficient (ε) [×10$^{-12}$Pa$^{-1}$] | −0.4 | 5 | 18 | 26 | 6 | 10 |
|---|---|---|---|---|---|---|
| Phase difference ratio (Re(450)/Re(550)) | 1.03 | 1.02 | 0.99 | 0.48 | 0.99 | 0.93 |
| Phase difference ratio (Re(650)/Re(550)) | 0.99 | 0.99 | 1.00 | 1.20 | 1.01 | 1.03 |

| | | | Example 7 | Example 8 | Comparative Example 1 | Comparative Example 2 | Comparative Example 3 |
|---|---|---|---|---|---|---|---|

Synthesis of polyester resins

| Amounts of monomers used [g] | Hydroxycarboxylic acid ester | D-NHEs | 8.40 | 4.81 | 0 | Commercially-available product was purchased | Commercially-available product was purchased |
|---|---|---|---|---|---|---|---|
| | Diester | DMCD | 0 | 0 | 32.14 | | |
| | | FDPM | 3.78 | 6.31 | 0 | | |
| | | DMT | 0 | 0 | 0 | | |
| | Diol | CHDM | 1.65 | 2.73 | 34.72 | | |
| | | EG | 0 | 0 | 0 | | |
| | | BPEF | 0 | 0 | 0 | | |
| Amounts of catalysts used | Titanium(IV) tetrabutoxide | | 5.99 | 5.97 | 0 | | |
| | Tin(II) octylate | | 0 | 0 | 26.01 | | |

Evaluation results (polyester resins)

| Copolymerization composition [mol %] | Hydroxycarboxylic acid unit = Unit (A) | D-NHEs | 61 | 36 | 0 | 0 | BPA-PC |
|---|---|---|---|---|---|---|---|
| | Dicarboxylic acid unit = Unit (C) | DMCD | 0 | 0 | 50 | 0 | |
| | | FDPM | 19.5 | 32 | 0 | 0 | |
| | | DMT | 0 | 0 | 0 | 50 | |
| | Diol unit = Unit (B) | CHDM | 19.5 | 32 | 50 | 16 | |
| | | EG | 0 | 0 | 0 | 34 | |
| | | BPEF | 0 | 0 | 0 | 0 | |
| Glass transition temperature (Tg) [° C.] | | | 133 | 115 | 55 | 81 | 153 |
| Amount of heat generated at cooling crystallization (ΔHc) [J/g] | | | 0 | 0 | 0 | 0 | 0 |

Evaluation results (optical films)

| Photoelastic coefficient (ε) [×10$^{-12}$Pa$^{-1}$] | 14 | 24 | 47 | 123 | 80 |
|---|---|---|---|---|---|
| Phase difference ratio (Re(450)/Re(550)) | 0.85 | 1.60 | 1.02 | 1.38 | 1.08 |
| Phase difference ratio (Re(650)/Re(550)) | 1.07 | 0.74 | 0.99 | 0.71 | 0.96 |

*Re (450), Re (550), Re (650): Phase difference values at measurement wavelengths of 450 nm, 550 nm, and 650 nm [nm]

The abbreviations in the table are defined as follows.

D-NHEs: Decahydro-1,4:5,8-dimethanonaphthalene-2-methoxycarbonyl-6(7)-methanol

DMCD: Dimethyl 1,4-cyclohexanedicarboxylate (cis isomer/trans isomer=7/3)

FDPM: 9,9-Bis(2-methoxycarbonylethyl)fluorene (also referred to as "dimethyl fluorenedipropionate")

DMT: Dimethyl terephthalate

CHDM: 1,4-cyclohexanedimethanol (cis isomer/trans isomer=3/7)

EG: Ethylene glycol

BPEF: 9,9-Bis[4-(2-hydroxyethoxy)phenyl]fluorene (also referred to as "bisphenoxyethanolfluorene")

BPA-PC: Bisphenol A-based polycarbonate resin

The present application is based on the Japanese patent application (Japanese Patent Application No. 2016-190300) filed on Sep. 28, 2016, and the contents of the Japanese patent application are incorporated herein by reference.

INDUSTRIAL APPLICABILITY

The optical film of the present invention is superior in transparency, heat resistance, and optical characteristics, and can be suitably used, in particular, for applications requiring these physical properties.

The applications of the optical film of the present invention are not particularly limited and may be any applications for which the feature of the optical film is beneficial. The optical film can be suitably used not only in a retardation film or polarizing plate but also in optical devices such as a viewing angle-widening film, a liquid crystal display device, an organic or inorganic electroluminescent display device or element, a plasma display, a CRT, a liquid crystal projector, an optical pickup system for an optical recording/reproduction apparatus, a touch panel, and an anti-reflection film.

That is, the present invention is of great industrial significance.

The invention claimed is:

1. An optical film comprising a polyester resin comprising a structural unit (A) of the following formula (1) wherein the content of the structural unit (A) based on the total structural units of the polyester resin is 76 mol % or greater:

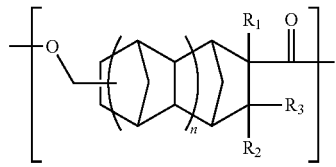

wherein
$R_1$ is a hydrogen atom, $CH_3$, or $C_2H_5$,
$R_2$ and $R_3$ is each independently a hydrogen atom or $CH_3$, and
n is 1.

2. The optical film according to claim 1, wherein, in the formula (1), $R_1$, $R_2$, and $R_3$ are hydrogen atoms.

3. The optical film according to claim 1, wherein the polyester resin satisfies the following conditions (1) and (2), and the optical film satisfies the following condition (3):
 (1) a glass transition temperature of the polyester resin is 90° C. or higher;
 (2) an amount of heat generated by the polyester resin at cooling crystallisation is 5 J/g or less; and
 (3) an absolute value of photoelastic coefficient of the optical film is $40\times10^{-12}$ $Pa^{-1}$ or less.

4. A retardation film comprising the optical film according to claim 1.

5. A circularly or elliptically polarizing plate comprising the optical film according to claim 1.

* * * * *